(12) United States Patent
Rezgui

(10) Patent No.: US 7,360,430 B2
(45) Date of Patent: Apr. 22, 2008

(54) HIGH IMPEDANCE THIN FILM FOR STRAIN GAUGE APPLICATIONS

(75) Inventor: Fadhel Rezgui, Chatillon (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/553,042

(22) Filed: Oct. 26, 2006

(65) Prior Publication Data

US 2007/0107494 A1    May 17, 2007

(30) Foreign Application Priority Data

Nov. 2, 2005    (EP) .................................. 05110278

(51) Int. Cl.
*G01L 9/02*    (2006.01)

(52) U.S. Cl. .......................................... 73/719; 73/725

(58) Field of Classification Search ............... 73/719, 73/725, 746
See application file for complete search history.

(56) References Cited

U.S. PATENT DOCUMENTS 4,325,048 A    4/1982  Zaghi et al.

FOREIGN PATENT DOCUMENTS

EP    0526290    2/1993

*Primary Examiner*—Andre J. Allen
(74) *Attorney, Agent, or Firm*—James Kurka; Brigitte Echols; Bryan White

(57) ABSTRACT

A resistive thin film (1) made of grains (3) of conductive material having an average size, in a dielectric medium (2) is characterized by the total thickness of the film (1) being between 3 and ten times the average size of the grains (3). The film (1) is used to make a cell of a pressure sensor and the cell is included in a shell of a pressure sensor.

11 Claims, 3 Drawing Sheets

HIGH IMPEDANCE THIN FILM FOR STRAIN GAUGE APPLICATIONS

BACKGROUND OF THE INVENTION

1. Field of the Invention

The invention relates to a resistive thin film. Such films are devoted for instance to make strain gauges that are used for high accuracy and very low power consumption and in particular to make pressure sensors.

The invention is also devoted to a measuring cell including a diaphragm with such a thin film mechanically linked to it and to a shell of a pressure sensor.

2. Description of the Prior Art

A pressure sensor module generally comprises a sensor shell having an aperture for receiving a fluid, the pressure of which is to be measured by the sensor. The shell comprises a separating membrane which can be deflected when a positive or negative pressure is applied by the fluid present at the aperture of the shell. The separating membrane tightly separates an inner closed volume of the shell from an open volume of the shell having the aperture. The closed volume of the shell contains a pressure transmitting medium and a measuring cell. The pressure of the fluid present in the open volume of the shell in then indirectly applied to the measuring cell, by means of the membrane and of the transmitting medium, for instance silicon oil. Because of the separating membrane the cell is immerged in the pressure transmitting medium and is then protected from corrosive fluids the pressure of which is to be measured. The measuring cell is made of two half cells bonded to one another. This hydrostatic configuration allows encapsulating the cell without rigid or mechanical bounding. This allows decoupling unwanted stress or staining resulting from, for instance, thermal expansion or mechanical shocks.

A hallow part inside the measuring cell allows for a deflection of a diaphragm of the cell. Resistors forming a bridge are mechanically linked, for instance bonded or deposited on a surface of a diaphragm of the measuring cell. When the diaphragm of the cell having the resistors linked on it is deflected by the pressure of the transmitting medium, the resistors are deformed. The deformation results in a variation of the value of the resistance of the resistors. The resistors may be made of thin film which are bonded or coated onto the diaphragm. For such an application the thin film must have high sensitivity to strain. This sensitivity is measured by a coefficient G call gauge factor which is given by the following formula:

$$G = \left(\frac{dR}{dl}\right) * \frac{1}{R}$$

Where R and dR are respectively the value of the resistance and a variation of it, dl is a variation of a length l of the resistor.

In general, for metallic film (Platinum, Tantalum, Nickel, . . . ). the guage factor is purely geometrical and is around 2. For doped material such as for silicon with Bohr, the gauge factor can reach 80. For thin film composed of a microscopic mixture of metal grains and ceramic matrix (cermet), at the percolation (the mixture is around 50%-50%) the guage factor can reach 10.

A kind of thin film which is used for the purpose of making resistors, in particular resistors to be used in pressure cells is made of a cermet of tantalum (Ta) grains in a dielectric nitride of tantalum (NTa). These thin films have the particularity to have a high gauge factor, low temperature coefficient of resistance (TCR) and are very stable at high temperature. Document EP 0 526 290, incorporated herewith by reference, describes a process of preparation of such a thin film To reduce sensor power consumption, for instance, for remote control and memory gauge purposes, the resistor must be as high as possible (several KOhm).

The shape of each resistor is generally chosen so that the length of the resistor is the longest that can fit with the surface of the diaphragm.

In the pressure bridge configuration, the resistance of diagonally opposed legs varies equally and in the same direction as a function of the mechanical deformation caused by pressure. As the resistance of on set of diagnally opposed legs increases under pressure, the resistance of the other set decreases. Bridge excitation in the form of a voltage or currency is applied across two opposite nodes of the bridge. These nodes are usually referred to as excitation inputs or bridge drive inputs. The bridge inputs are connected through tight connections to external connections of the measuring cell and then on external connections of the shell.

SUMMARY OF THE INVENTION

The invention is devoted to improvement of a thin film for making resistors, and in particular for making high impedance resistors for bridges of pressure measuring cells.

According to the invention the value of the resistance per length unit of the thin film is increased by having a thickness value which is less than ten times the average value of the size of the grains. In this way the thickness of the film is less than the one of known films, and for equal surfaces covered by the film, the values of the resistance of a resistor is increased. This results in a number of advantages, and in particular for any application, a value of a resistor can be reached with a smaller surface. So the size of a device using a resistor made with the invented film can be reduced.

For the application of the film where the film is mechanically attached to a diaphragm of a pressure cell, a diameter of said cell can be decreased, using the same high impedance input value of a bridge. This allows keeping the power consumption very low. In addition, since the Joule effect is reduced (heating effect), better stability and improved metrology have been observed.

BRIEF DESCRIPTION OF THE FIGURES

An example of an embodiment of the invention will now be described in greater detail with reference to the accompanying drawings, in which.

Figure 1:
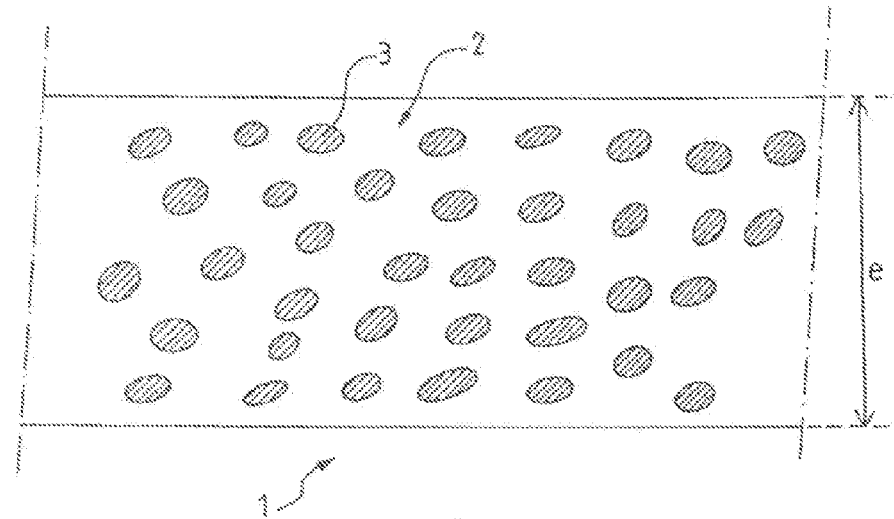
FIG. 1 is a schematic large scale view of a film for explaining the invention.

In the drawings same reference numbers are for the same items or for items having similar functions. The terms upper and lower are used to case the description of the relative position of the different element. They are true in the drawings, but of course the sensor may be oriented a different way then vertical.

EXAMPLES OF PREFERRED EMBODIMENTS

Before describing an embodiment of the invention some theoretical knowledge in here below remembered.

The value of a resistor is given by the well known formula $$R = \rho \cdot \frac{l}{S} \qquad (1)$$

In said formulae R is the resistance or value of the resistor.
ρ is the resistivity of the film,
l is the length of the film,
S is the surface of a section through the thickness of the film.

The value of the surface S is then the product of the thickness e of the film by the width w of the film. l/w is equal to a number n. This number represents a number of squares which is then simply defined by the geometry of the resistor.

The formulae (1) can be written $$R = \rho n/e \qquad (2)$$

For pieces of film having the same surface, formulae (2) shows that for films of equal resistivity ρ, the value of the resistor is increasing when the thickness e of the film is decreasing.

As explained in the description of the prior art, the film is made of conductive grains, for instance tantalum grains, in a non conductive medium. The resistivity ρ of the film is decreasing with the volumetric density of the grains.

FIG. 1 represents a cross section of a part of a thin film 1 making up a resistor according to an exemplary embodiment of the invention. In a known way said film is made by a dielectric 2, for instance a TaN, charged with grains 3 of a conductive material, for instance Ta.

These thin films have not only an electrical discontinuity, metallic grains surrounded by a dielectric, but also a mechanical discontinuity, the Ta grain being much more rigid than the dielectric. When a strain is applied to such films, all the deformation is absorbed by the matrix making the average distance of one grain to the nearest others shorter or longer. As a result the value of the resistance of the gauge is strongly modified.

When the film is too thin, the deformation becomes uniform, the matrix and the grains are submitted roughly to the same deformation. That means that the volumetric density and so the resistivity is practically constant. This cancel the amplification of the strain in the matrix and the resistance change becomes small. The gauge factor becomes then purely geometrical and is about 2.

From the above given explanations, it may be understood that for films having the same size and density of grains, the sensitivity of the film will be a function of the thickness of the film The thicker the film is and the more the film becomes sensitive to change of shape. So, on one hand, to get a thin film having a great resistivity so as to have great resistance values on a small surface, the film must be as thin as possible. On the other hand, the film must have a reasonable sensitivity then it must be thick enough. There must be a trade off between a reasonable sensitivity and a great resistivity.

Obviously the smallest thickness of such a film would be a thickness equal or round to equal the average size of the grains, so that at least the film has one layer of grains. In such a film the gauge factor becomes then purely geometrical. It has been found by the inventor that a good trade off would be a film having a thickness between 3 and 10 times the average size of the grains.

In an exemplary embodiment the resistive thin film has a total thickness less than 0.1 μm.

In an other exemplary embodiment the resistive thin film has a total resistivity less than 1000 μΩcm.

When the film thickness is above 3 times the equivalent size of a grain, said size of a grain being typically 100 Angstroms, strain amplification appears again, leading to recover the high gauge factor (about 10).

As explained above, for a constant applied voltage by length unit of said film the conductivity or the resistivity is a function of an average size of the grains, of their average distance from one to the nearest others and from the thickness of the film. On FIG. 1 the film is represented flat. What happens to said film 1 when said film 1 having a thickness according to the invention between three and ten times the average size of the grain, is extended or shortened in length, is that the matrix only is extended or shortened. Because the matrix only in extended or shortened, the average distance between a grain and the nearest others is increasing or decreasing in a greater proportion than the increase or decrease of the total length of the film and the gauge factor is increased. That means that the resistance value of a length of film is decreasing when the film is shortened or increasing when the film is extended in a greater proportion than the one resulting from geometrical deformation.

When the film has the thickness according to the invention it becomes particularly remarkable and identifiable compared to resistive metallic films already available on the market. As a matter of clear and visual distinction of the invention compared to prior art solutions, it can be said that any film made of Ta or TaN or equivalent metallic component which is such thin that it becomes transparent to the visible light, can be said to meet the technical requirements of the invention.

Figure 2:
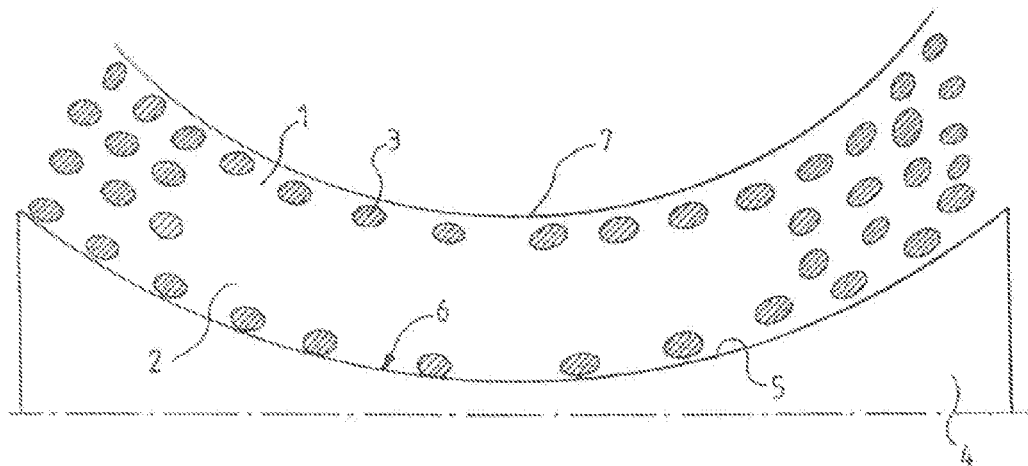
FIG. 2 is a view of the same film as in FIG. 1 but bent to explain some reasonable limitation in the medium thickness of the film

What happens to said film 1 when said film 1 is mechanically linked to a surface and when said surface is deflected will now be commented in relation with FIG. 2. FIG. 2 represents in a very large scale a part of a surface 5 of a diaphragm 4 on which a pressure is applied so that the surface 5 is deflected. The film 1 has what will be by convention designated as a lower surface 6 and an upper surface 7. The lower surface 6 of the film is the one which is mechanically linked to the surface of the diaphragm 4. The upper surface 7 is opposed to the lower surface 6 through the thickness of the film 1. When the surface 5 of the diaphragm 4 is in a first case, bent for instance inwardly as represented on FIG. 2, the length of the lower surface 6 of the film 1 is slightly extended, about in the same proportion as the surface 5 of the diaphragm 4. The upper surface 7 of the film 1 is shortened in a greater proportion than the lower surface 6 is extended. As an average the volume of the film is shrunken, so that he average distance of one grain to the nearest others is decreased and conductivity of the film is increased. As a result the value of the resistance of the resistor is decreased. On the reverse, if in a second case, the film 1 is placed on a part of the diaphragm which is deflected outwardly upon pressure, the length of the upper surface 7 of the film 1 is extended in a greater proportion than the length of the lower surface 6. As an average in this second case, the volume of the film is increased, so that the average distance of one grain to the nearest others is increased too and the conductivity of the film is decreased. As a result the value of the resistance of the resistor is increased.

As explained in the description of the prior art, the man skilled in the art will place the resistors forming one leg of the bridge on the part of the diaphragm that will deflect outwardly upon pressure. He will place the resistors forming the other leg of the bridge on the part of the diaphragm that will deflect inwardly upon pressure.

Figure 3:
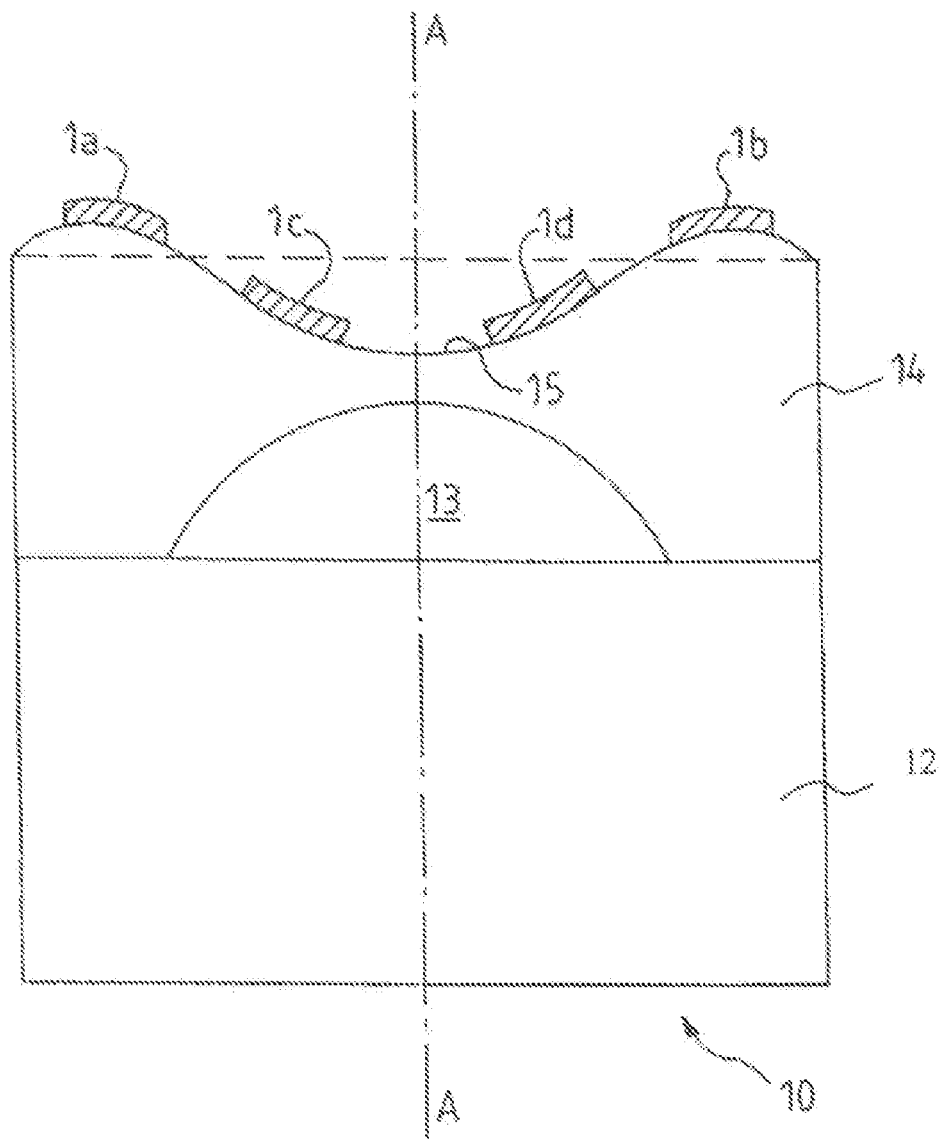
FIG. 3 is a cross section of a pressure sensor cell using a film according to the invention.

A use of a cell for a pressure sensor using the invented film and the advantages there of will be now explained in relation with FIG. 3

FIG. 3 is an axial section of a synthetic sapphire cell 10 having for instance a cylindrical shape, and having an axis AA. Cell 10 is made of two half parts, 12 and 14 assembled together. A hollow part 13 is closed inside the assembly 12, 14. The upper part 14 of the assembly is a diaphragm having a top surface 15. The hollow part 13 allows the diaphragm and specially its top surface 15 to be deflected when the cell 10 is under pressure. At a reference pressure the surface would be flat as represented in dashed line in FIG. 3. If a pressure is applied, surface 15 of the diaphragm is deflected as shown in the FIG. 3. Parts 1a, 1b; 1c, 1d of a thin film 1 are bonded on surface 15. Due to the deflection of surface 15, parts 1a, 1d are deflected outwardly while parts 1b, 1c of thin film 1 are deflected inwardly. Parts 1a, 1d, form one leg of the bridge and part 1b, 1c form the other leg. The resistances of one leg are then increased and the other one is decreased. The unbalance is measured in a known way and linked to the applied pressure. One main advantage of using the thin film of the invention is that for a given value of a resistor, the surface covered by the pieces of film may be less than the one with the films of prior art. The size of the diaphragm being less, the size of the cell 10 can be less, and so the total outside surface of the cell 10 can be less. The advantages of using a small cell will now be explained in relation to FIG. 4.

Figure 4:
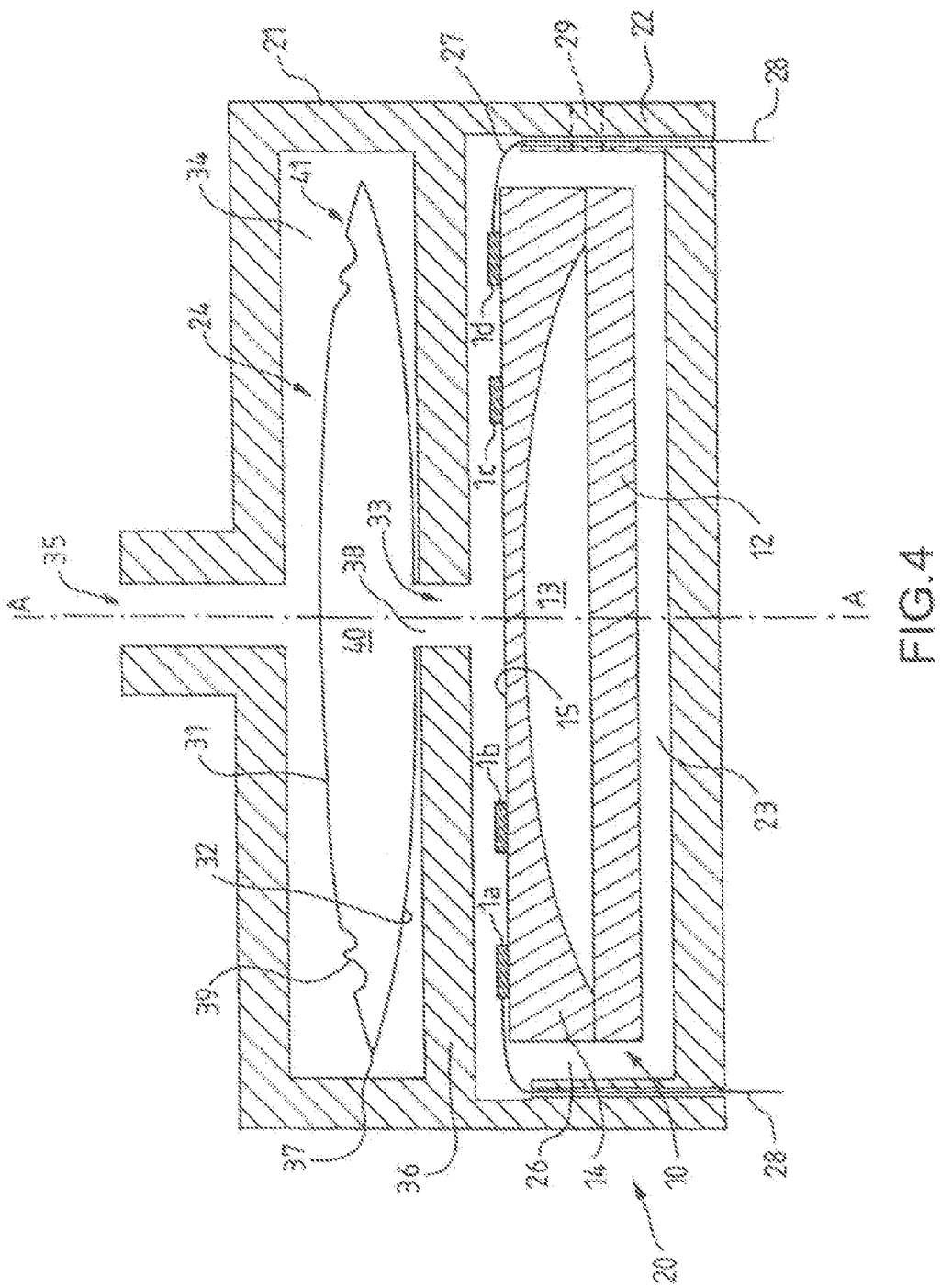
FIG. 4 is a cross sectional view of a pressure sensor shell in an embodiment using the pressure sensor cell of FIG. 3 and an advantageous membrane in the form of a bellow having only an upper and a lower sheet mechanically linked to a supporting separating wall.

FIG. 4 is an axial cross section of a shell 20 of a pressure sensor including a cell 10 as represented in FIG. 3. Shell 20 is made of tow half shells, an upper half shell 21 and a lower half shell 22, tightly assembled together. An inner volume of the shell 20 is divided in two chambers 23 and 34, a lower chamber 23 and an upper chamber 34 by a membrane 24. According to a novel and advantageous feature of the invention, the membrane is made of a supporting wall 36 perpendicular to the axis AA common to the cell 10 and the shell 20. The supporting wall 36 separates the lower chamber 23 from the upper chamber 34. However the supporting wall 36 has a central aperture 33. The lower chamber 23 of the shell 20 contains the cell 10. Electrical inner connections 27 and outer connections 28 are provided to deliver electrical power to the bridge of resistors 1a, 1d and to collect a signal there from indicating the applied pressure. The outer connections 28 are to be connected to a power supply and processing circuit known per se.

The upper chamber 34 has an aperture 35 to receive the fluid, the pressure of which is to be measured. The upper chamber 34 contains an upper surface of a supporting wall 36 and a cap 41 of the membrane 24. By stipulating definition the membrane 24 is composed of the supporting wall 36 and the cap 41. The cap 41 is a kind of below made of an upper sheet 31 and of a lower sheet 32. The sheets 31, 32 forming together the cap 41 are welded to one another at a common periphery 37 of said sheet 31, 32 for instance by laser welding. The lower sheet 32 of the cap 41 has a central aperture 38. Edges of the central aperture 38 of the cap 41 are mechanically tightly joined to edges of the central aperture 33 of the separating supporting wall 36. Wavelets 39 on the upper sheet 31 ease the deflection of the cap 41 under pressure. Hence, the value of the pressure transmitted to a transmitting medium is not changed by a counter pressure of the membrane 24 itself. An inner volume 40 of the cap 41 is defined as the volume limited by the upper and lower sheets. 31, 32. An intermediary aperture 29 is joining the lower chamber 23 of the shell 20 to the exterior of the shell 20. Said intermediary aperture 29 is used to introduce the pressure transmitting medium, for instance silicone oil, in the lower chamber 23 of the shell 20 and in the inner volume 40 of the cap 41. The filling of the lower chamber 23 of the shell 20 and of the inner chamber 40 of the cap 41 is made under vacuum to prevent bubbles of gas inside the inner lower chamber 23 and inside volume 40. The intermediary aperture 29 is then sealed. It is the reason why the aperture 29 is qualified "intermediary" and is represented FIG. 4 is doted lines. The pressure transmitting medium is present in the inner lower chamber in a volume 26 of said chamber 23, all around an outer surface of the cell 10, and in the inner volume 40 of the cap 41. The volume of the pressure transmitting medium is the sum of the volume 26 which is the volume of the lower chamber 23 which is not occupied by the cell 10 and of inner volume 40 of the cap 41. It is to be noted that the dimension in height between the two sheets 31, 32 of the cap 41 is represented at a greater scale than the dimensions of the diameter of the shell 20 and of the cell 10 to make the figure easier to understand. It is the same for the height (thickness) of the separating supporting wall 36. In one embodiment at the maximum of the distance between the two sheets 31, 32 the height is 2 mm. Hence, the inner volume 40 of the cap 41 is about 100 cubic millimetres.

The functioning of the shell 20 in the following. The pressure to be measured is received at the outer aperture 35 of the upper inner chamber 34 of the shell 20. The pressure is transmitted to the sapphire cell 10 through the cap 41 and the pressure transmitting medium present in the inner volume 26 surrounding the cell 10, and in the inner volume 40 of the cap 41. The surface 15 of the upper part 14 of the cell 10 is deflected. The deflections fosters a modification of the value of resistors 1a and 1d of the bridge of resistors. An electric signal is modified according to the deflection resulting from the measured pressure. Said signal is sent to processing circuit (not shown) through electrical connections 27, 28.

The advantages of the features which have just been described will now be explained. First, because the thin film which is used to made resistors 1a to 1d of the bridge have a high resistivity by unit length, the surface covered by the resistors may be smaller than the surface that would be occupied by resistors having the same value but made with films of prior art. Also the power supply needed by the resistors bridge may be made smaller. An increase in temperature of the transmitting medium due to the power sent to make the measure is smaller and then dilation of the transmitting medium is negligible. Also the diameter of the cell 10 may be smaller. Because there is a rigid supporting wall 36 between the two inner chambers 23 and 34 of the shell 20, the supporting wall 36 can be very near the top surface 15 of the cell 10. There is no risk that due to the movement of the cap 41, short circuit occurs between the electrical connections 27, 28 and the cap 41. So the distance between the external surface of the cell 10 and an internal surface of the lower chamber 23 may be as small as 100 μm and even below. If D is the diameter of the cell 10, h its height and W the distance between the inner surface of the lower chamber 23 and the outer surface of the cell 10, it may be said in a first approximation that the volume 26 V is equal to the product of the outer surface of the cell and of the distance W.

$$V = \pi DW\left(\frac{D}{2} + h\right)$$

In one embodiment for which the excitation input of the bridge is more than 16 KΩ, about 17 KΩ, D is less than 7 mm, about 6 mm, h is about 4 mm and W is less than 200 μm, for instance 100 μor even less, so that the volume 26 is less than 200 cubic millimeters. Hence the total volume of the transmitting medium is less than 300 cubic millimeters. Due to the volume of the transmitting medium being relatively small, the variations of volume of the transmitting medium, in a wide range of temperatures, can be absorbed by deflection of cap 41 and there is no need to compensate the effect of temperature in the processing circuit.

Such a shell 20 which had been described above, is for use for instance, in drilled well, for instance for oil or oil researches.

The embodiments described above are exemplary embodiments, the invention being defined by the appended claims.

The invention claimed is:

1. A resistive thin film made of grains of conductive material having an average size, in a dielectric medium wherein the total thickness of the film is between 3 and ten times the average size of the grains.

2. A resistive film according to claim 1 wherein the resistivity per square is greater than 50 Ohm/square.

3. A resistive thin film according to claim 1 wherein the total thickness of the film is less than 0.1 μm.

4. A resistive thin film according to claim 1, wherein the total resistivity is less than 1000 μΩcm.

5. A resistive thin film according to claim 1 wherein the grains are tantalum grains and the dielectric medium is tantalum nitride.

6. A cell of a pressure sensor, the cell having a deflectable upper surface with resistors upon it made in a thin film and mechanically linked to said upper surface and a total outer surface including said upper surface wherein the thin film making the resistors is according to claim 1.

7. A cell of a pressure sensor according to claim 6 wherein the cell is made in synthetic sapphire.

8. A cell of a pressure sensor according to claim 6 wherein the cell is in the form of a cylinder having a diameter less than 7 mm and a bridge impedance input more than 5 KΩ.

9. A shell of a pressure sensor, the shell being separated by a membrane in two chambers an upper one and a lower one, the lower one containing a cell and a pressure transmitting medium around the outer surface of the cell, the upper chamber having an aperture to receive a fluid, the pressure of which is to be measured, wherein the cell in the lower chamber is according to claim 6.

10. A shell of a pressure sensor according to claim 9 wherein the membrane is made of a support having a central aperture with edges of the aperture, the support separating but for the central aperture the lower chamber from the upper chamber, and of a cap made of an upper sheet and of a lower sheet both having a periphery, the lower sheet having a central aperture with edges of said aperture of the lower sheet, the edges of the central apertures of the support and of the lower sheet respectively being tightly mechanically linked to one another, the peripheries of the upper and lower sheet being tightly linked to one another so that a volume is present between said upper and lower sheet, said volume being in the upper chamber of the shell and communicating through the central apertures of the support and of the lower sheet respectively, with the lower chamber so that the pressure transmitting medium is present in the lower chamber and in the inner volume of the cap.

11. A shell of a pressure sensor according to claim 9 wherein, a distance between the outer surface of the cell and an inner surface of the lower chamber said surface of the lower chamber including a lower surface of the supporting wall of the cap, is less than 200 μm all around the outer surface of the cell.

* * * * *